Figure 1:
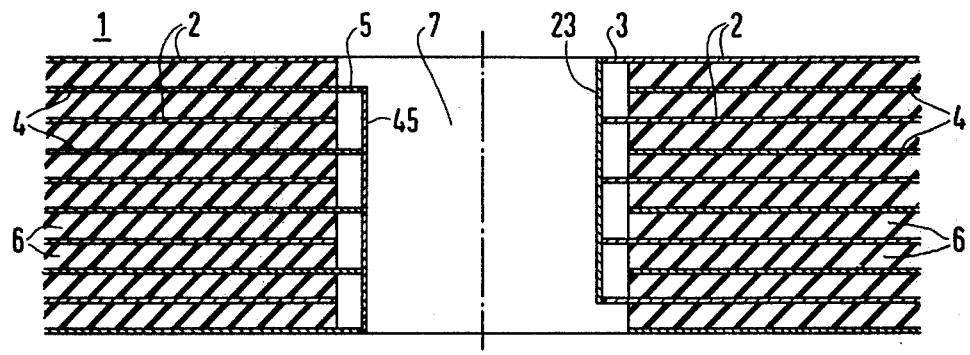

United States Patent [19]

Cirkel

[11] 4,169,250
[45] Sep. 25, 1979

[54] HIGH-ENERGY LASER

[75] Inventor: Hans-Jürgen Cirkel, Erlangen, Fed. Rep. of Germany

[73] Assignee: Kraftwerk Union Aktiengesellschaft, Mülheim, Fed. Rep. of Germany

[21] Appl. No.: 822,795

[22] Filed: Aug. 8, 1977

[30] Foreign Application Priority Data

Aug. 11, 1976 [DE] Fed. Rep. of Germany ....... 2636177

[51] Int. Cl.² .................................... H01S 3/097
[52] U.S. Cl. .................. 331/94.5 PE; 331/94.5 D
[58] Field of Search ............... 331/94.5 D, 94.5 G,
331/94.5 PE; 330/4.3

[56] References Cited

U.S. PATENT DOCUMENTS 4,053,853  10/1977  Collins, Jr. .................. 331/94.5 PE Primary Examiner—William L. Sikes
Attorney, Agent, or Firm—Herbert L. Lerner

[57] ABSTRACT

High-energy laser excitable by an arc-free capacitor discharge includes a power capacitor with minimal self-inductance formed of a stack of metal layers mutually superimposed perpendicularly to a given axis, with respective layers of insulation disposed between mutually adjacent metal layers of the stack, the metal layers and the insulation layers being formed with mutually aligned cut-outs in vicinity of the given axis so as to form a free space within the stack, respective surface portions of alternating layers of the metal layers projecting into the free space above one another as electrodes of given common polarity, the surface portions of the metal layers of respective opposite common polarity being disposed symmetrically with respect to the given axis in the free space; and a laser tube formed with a discharge chamber and having discharge electrodes, the laser tube being disposed in the free space of the power capacitor, the electrodes of given common polarity of the power capacitor being connected to the discharge chamber of the laser tube.

4 Claims, 4 Drawing Figures

HIGH-ENERGY LASER

The invention of the instant application relates to the excitation of a high-energy laser by an arc-free or non-arcing capacitor discharge. Such laser constructions have become known heretofore, for example, from the journal "Opto Electronics" 4 (1972), pages 43 to 49 as well as from "Applied Physics Letters" Vol. 25, No. 12 of Dec. 15, 1974, pages 703 to 705. In these and other disclosures, reference is made to the use of a low-inductance capacitor constructed in the form of a strip line, the energy of which is transmitted to the electrodes of the discharge chamber of the laser tube through fast-acting switches e.g. spark gaps, in order to effect excitation of the laser gas. In this type of laser excitation, at least two problems must be solved, namely, that of storing maximal electric energy in the capacitor and that of effecting homogeneous excitation of the laser gas at predetermined electric field intensities, while avoiding arcing between the excitation electrodes in the laser tube. For the first problem or requirement, a limit to the maximal stored electric energy is fixed by the capacitance of the strip line which, for the devices described in the aforementioned disclosures and for a discharge channel 1 m long, is between about 0.01 $\mu F$ and 0.1 $\mu F$, which is a limit that would have to be exceeded considerably for a high-energy laser. To master the second problem, a special form of a strip-line capacitor as well as a special construction of the discharge surface as a multiplicity of parallel knife edges have been proposed heretofore. However, electrode surfaces of such construction are not suited to withstand continuous operation, so that the need has arisen to solve the aforestated problems in another more successful manner.

It is accordingly an object of the invention to provide a high-energy laser of the foregoing type which solves the foregoing two problems while avoiding the aforementioned disadvantages of the heretofore known devices of this general type.

With the foregoing and other objects in view, there is provided, in accordance with the invention, an high-energy laser excitable by an arc-free capacitor discharge comprising a power capacitor with minimal self-inductance formed of a stack of metal layers mutually superimposed perpendicularly to a given axis, with respective layers of insulation disposed between mutually adjacent metal layers of the stack, the metal layers and the insulation layers being formed with mutually aligned cut-outs in vicinity of the given axis so as to form a free space within the stack, respective surface portions of alternating layers of the metal layers projecting into the free space above one another as electrodes of given common polarity, the surface portions of the metal layers of respective opposite common polarity being disposed symmetrically with respect to the given axis in the free space; and a laser tube formed with a discharge chamber and having discharge electrodes, the laser tube being disposed in the free space of the power capacitor, the electrodes of given common polarity of the power capacitor being connected to the discharge chamber of the laser tube.

Reference can be had to my copending application Ser. No. 822,675, filed on or about Aug. 4, 1977 and entitled POWER CAPACITOR, for further details of a power capacitor that may be employed in the high-energy laser of this application.

In accordance with another feature of the invention, the discharge electrodes of the laser tube are spaced from at least the electrodes of one common polarity of the power capacitor, the space therebetween being formed as a switching spark gap, a stripline capacitor with a fast-acting switch being connected to the switching spark gap.

In accordance with a further feature of the invention, the discharge electrodes of the laser tube at least partly define respective chambers for the switching spark gap within the laser tube.

In accordance with a concomitant feature of the invention, the high-energy laser includes an ignition electrode extending over the entire length of the laser tube and disposed parallel to the discharge electrodes of the laser tube within the free space formed in the power capacitor, a stripline capacitor with a fast-acting switch being connected to the ignition electrode for applying a different potential thereto than at the discharge electrodes.

Thus, the capacitor electrodes are connected either directly or indirectly to the discharge chamber of the laser tube, and the connection between the capacitor electrodes and the discharge electrodes of the laser tube is accordingly effected with extremely low inductance, which is true also for the switching spark gaps that are spatially or physically combined with this system.

Other features which are considered as characteristic for the invention are set forth in the appended claims.

Although the invention is illustrated and described herein as embodied in an high-energy laser, it is nevertheless not intended to be limited to the details shown, since various modifications and structural changes may be made therein without departing from the spirit of the invention and within the scope and range of equivalents of the claims.

Figure 2:
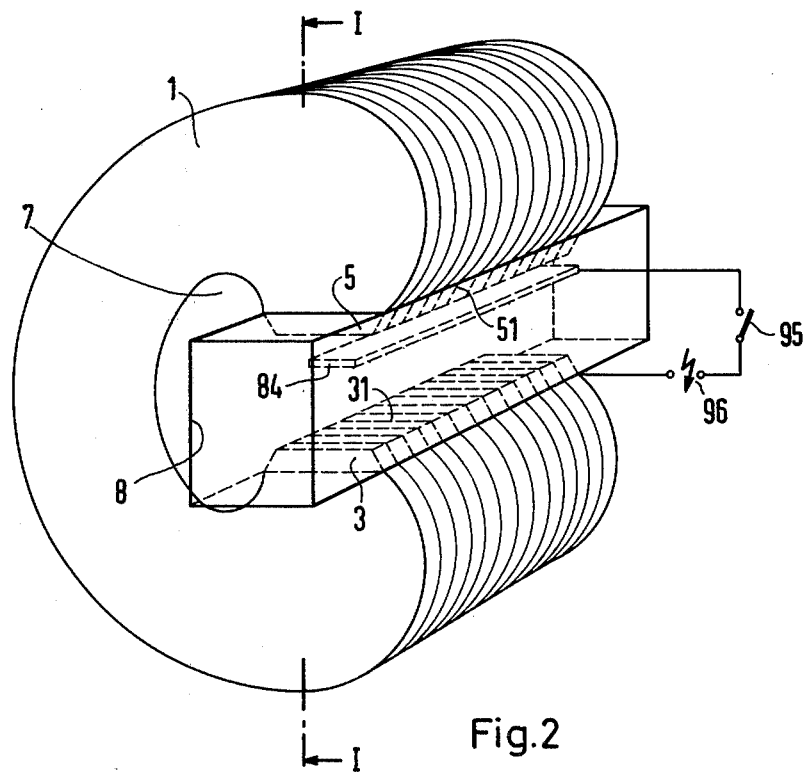
Figure 3:
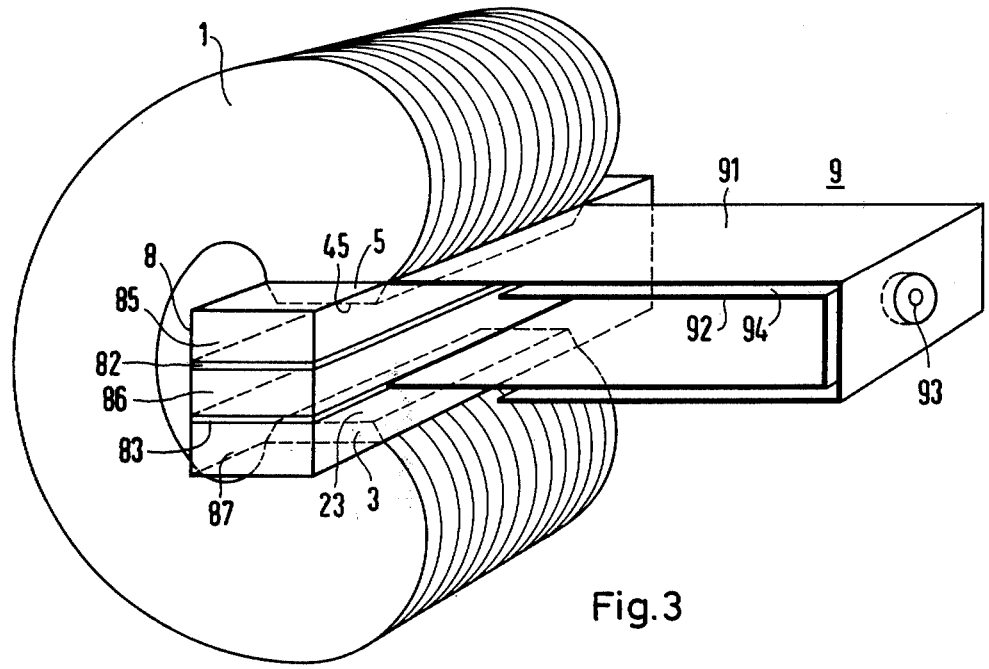
Figure 4:
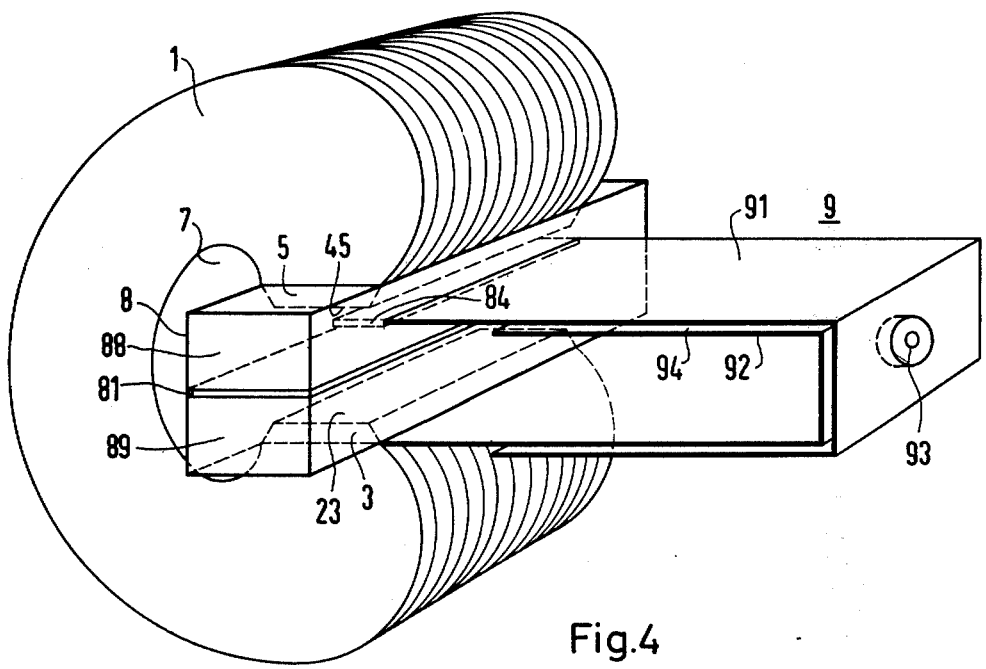

The construction and method of operation of the invention, however, together with additional objects and advantages thereof will be best understood from the following description of specific embodiments when read in connection with the accompanying drawings, in which:

FIG. 1 is a diagrammatic sectional view of a capacitor utilizable for exciting a high-energy laser in accordance with the invention; and FIGS. 2, 3 and 4 are similar perspective views of three different embodiments of a high-energy laser in conjunction with a power capacitor according to FIG. 1.

In FIGS. 2, 3 and 4, the connecting lines for the laser medium as well as for the switching spark gaps have been omitted in the interest of clarity, as have been the cooling devices which are necessary for such high-power operation. In the figures, like features are identified by the same reference numerals.

The general external form of the power capacitor 1 may be seen from FIGS. 2 to 4, and the internal construction thereof from FIG. 1, which corresponds to a cross sectional view of FIG. 2 taken along the line I—I and rotated through 90°. It is constructed of metal layers or electrodes 2 and 4 which are stacked one above the other, with interposed insulating discs 6, perpendicularly to the laser axis, which is shown as a vertical, central dash-dot line. These layers or electrodes 2, 4 are cut out in the form shown in the other figures, so that a free space 7 is obtained. Into the latter space 7, there project, on the one side, surface portions 3 of the capacitor layers or electrodes 2, and on the other side, surface portions 5 of the capacitor layers or electrodes 4. These projecting surface portions 3 and 5 are connected by bridges 23 and 45, respectively. A charging voltage source or lead, namely, in the case at hand, a laser tube 8 with discharge electrodes, is connected to the bridges 23 and 45 per se can, in turn, constitute the discharge electrodes for the laser tube 8, so that a feed line for the capacitor energy thereby becomes unnecessary and, moreover, the energy stored in the capacitor layers 2, 4 reaches the discharge electrodes for the laser tube 8 with uniform distribution.

In order to provide some idea of the capacities which are possible with such a capacitor construction, following is a description of an embodiment thereof with appropriate numerical data. With generally circular layers or electrodes 2 and 4 having an outside radius of 0.5 m and with a free space 7 having a radius of 0.15 m, as well as with insulating layers 6 having a respective thickness of 1 mm, a total area of about 530 m$^2$ and, thus, a capacitance of 14 $\mu$F per meter is obtained for a capacitor length of 1 meter. With a charging voltage of 50 kV, such a capacitor can store 18,000 Joule of energy. Increasing the outer radius to 1 m would increase the capacitance per meter length to about 62 $\mu$F and the energy content at 50 kV to just $80 \times 10^3$ Joule. It can be seen from the numerical data of this embodiment that the use of this type of capacitor construction permits very high output energies with suitable laser media, which, however, are not the subject of this invention.

FIG. 2 shows the simplest embodiment of a high-power laser constructed in accordance with the invention. The laser tube 8 is built into the free space 7 of the capacitor 1 in such a manner that the surface portions 3 and 5 of the capacitor 1 project into the interior of this space 7. A connecting bridge over these surface portions 3 and 5 is unnecessary; the connections between the electrodes or layers 2, 4 of the same polarity required for the charging process can be applied to the outer surface of the capacitor 1 in a non-illustrated manner. For exact control of the electrodes 31 and 51 which are constructed in comb-like fashion therebetween, it is advantageous to keep the charging voltage of the capacitor 1 lower than the breakdown voltage of the discharge space in the laser tube 8 and to provide, as means for triggering the discharge, an ignition electrode 84 which is fastened to the wall of the laser tube 8 in the vicinity of the one electrode 51. As shown schematically, a supplemental high-voltage source 96 is provided for triggering the discharge of the capacitor 1; this source 96 is connected at the one pole thereof to the electrode comb 31 and with the other pole thereof, through the fast-acting switch 95, to the ignition electrode 84. If this switch 95 is actuated, a corona discharge develops at the ignition electrode 84, which distributes the charge carriers into the discharge space and effects ionization thereof through ultraviolet radiation, so that an extremely rapid and simultaneous arc-free discharge of the energy stored in the capacitor 1 thereby occurs.

Another possible construction of the high-power laser is diagrammatically shown in FIG. 3. The laser tube 8 is again disposed between the electrodes 45 and 23 of the capacitor 1; these electrodes 45 and 23 represent connecting bridges of the respective surface portions 5 and 3 of the capacitor layers 2, 4 and project into the interior of the laser tube 8. The space of this tube 8 is subdivided by auxiliary electrodes 82 and 83 into three superimposed chambers 85, 86 and 87. To the auxiliary electrode 87 as well as to the capacitor electrode 45, there is then connected a stripline capacitor 9 which is formed of conductive layers 91 and 92 and an insulating layer 94 disposed therebetween. Between these two conductive layers 91 and 92, a fast-acting switch e.g. a thyratron 93, is connected for triggering the laser 8. This embodiment of the invention functions as follows. A laser medium, for example, the gas which is to be excited by the capacitor discharge and which has a breakdown voltage that is below the charging voltage of the capacitor 1, is found in the chamber 86. Before the discharge is triggered, the potential difference of the electrodes 82 and 83 is below the breakdown voltage of the enclosed gas. The chambers 85 and 87 respectively above and below the laser space 86 proper are likewise filled with gas and, with suitable choice of the gas, the pressure thereof and the spacing of the electrodes, no voltage breakdown occurs there either. These chambers may also be constructed, however, as vacuum spark gaps.

The electrode 83 is connected to the stripline conductive layer 92, and the other conductive layer 91 to the electrode 45 of the capacitor.

For triggering the discharge of the capacitor 1, the switch 93 e.g. a thyratron, is short-circuited. A potential is thereby developed at the electrode 83, which causes the voltage breakdown to the electrode 23 and places the electrode 83 at the potential of the capacitor electrode 23. The breakdown field-intensity between the auxiliary electrodes 83 and 82 is thereby exceeded, however, as well as the breakdown field-intensity between the electrodes 82 and 45, so that the fast, homogeneous discharge of the capacitor is thereby initiated.

A further possible construction of such a high-power laser is shown in FIG. 4. If one were to refer to the embodiment constructed in accordance with FIG. 3 as a three-chamber system, then the system according to FIG. 4 represents a two-chamber system. The lower chamber 89 is the laser space proper, and the upper chamber 88 is the switching spark gap, similar to the spaces 87 and 85 in the embodiment of FIG. 3. Similarly to the embodiment according to FIG. 2, an ignition electrode 84 is disposed in the space 88 and connected to the conductive layer 91 of a stripline capacitor 9. The other conductive layer 92 is electrically connected to the capacitor electrode 23 which, in this embodiment of FIG. 4, represents one laser electrode. An auxiliary electrode 81 disposed between the chambers 88 and 89 is the other laser electrode. The laser gas is provided in the discharge chamber 89; the potential between this auxiliary electrode 81 and the capacitor electrode 23 is below the breakdown voltage. Also, the corresponding field intensity in the chamber 88 in insufficient to initiate or introduce an independent gas discharge therein. If the switch 93 of the stripline capacitor 9 is then closed, the potential at the ignition electrode 84 is changed so that a corona discharge to the electrode 45 is instituted immediately, which allows the voltage of this electrode 84 to break through to the auxiliary electrode 81. Thus, the full voltage of the capacitor is located between the auxiliary electrode 81 and the capacitor electrode 23, so that there, too, the breakdown field strength or field intensity is exceeded, and the discharge and, accordingly, the excitation of the laser medium, result therefrom.

Supplementing this discussion, it should be mentioned that it is advantageous to charge the capacitor 1 to $\pm 25$ kV if a charging voltage of 50 kV is desired, since this simplifies the insulation problems with respect to the environment. The gas charge of the switching spark gaps may contain an additive consisting of an electronegative gas such as $SF_6$, for example. The physical or spatial combination of a laser with such a capacitor results in an almost absolutely uniform supply of the energy over the entire length of the discharge electrode, so that the arcing between the electrodes, which is otherwise initiated by irregularities of the current supply and, consequently, also of the voltage development, is thereby avoided.

Other embodiments of the invention are, of course, also conceivable, but the ones shown and described herein should be sufficient to illustrate adequately the operation of a high-power laser that is made possible by such a power capacitor 1.

What is claimed is:

1. High-energy laser excitable by an arc-free capacitor discharge comprising a power capacitor with minimal self-inductance formed of a stack of metal layers mutually superimposed perpendicularly to a given axis, with respective layers of insulation disposed between mutually adjacent metal layers of said stack, said metal layers and said insulation layers being formed with mutually aligned cut-outs in vicinity of said given axis so as to form a free space within said stack, respective surface portions of alternating layers of said metal layers projecting into said free space above one another as electrodes of given common polarity, the surface portions of the metal layers of respective opposite common polarity being disposed symmetrically with respect to said given axis in said free space; and a laser tube formed with a discharge chamber and having discharge electrodes, said laser tube being disposed in said free space of said power capacitor, said electrodes of given common polarity of said power capacitor being connected to said discharge chamber of said laser tube.

2. High-energy laser according to claim 1 wherein the discharge electrodes of said laser tube are spaced from at least the electrodes of one common polarity of said power capacitor, the space therebetween being formed as a switching spark gap, a stripline capacitor with a fast-acting switch being connected to said switching spark gap.

3. High-energy laser according to claim 2 wherein said discharge electrodes of said laser tube at least partly define respective chambers for said switching spark gap within said laser tube.

4. High-energy laser according to claim 1 including an ignition electrode extending over the entire length of said laser tube and disposed parallel to said discharge electrodes of said laser tube within said free space formed in said power capacitor, a stripline capacitor with a fast-acting switch being connected to said ignition electrode for applying a different potential thereto than at said discharge electrodes.

* * * * *